M. W. HEYENGA.
VEHICLE RUNNING GEAR.
APPLICATION FILED DEC. 3, 1907.

899,218.

Patented Sept. 22, 1908.
2 SHEETS—SHEET 1.

Inventor
M. W. Heyenga

M. W. HEYENGA.
VEHICLE RUNNING GEAR.
APPLICATION FILED DEC. 3, 1907.
899,218.
Patented Sept. 22, 1908.
2 SHEETS—SHEET 2.
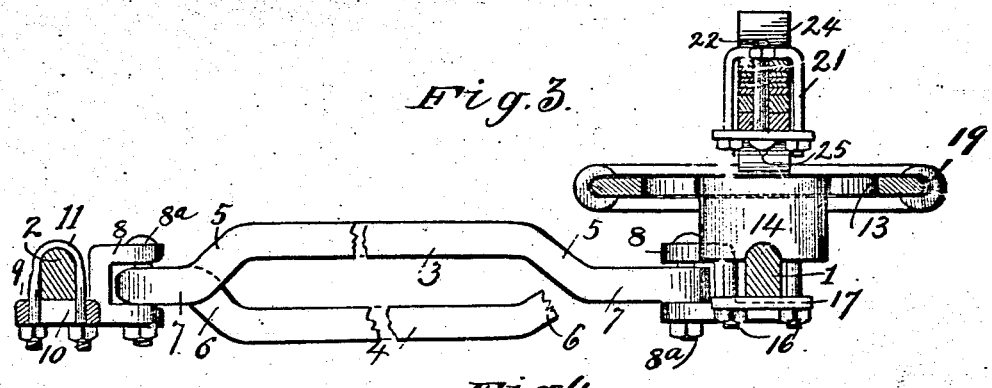
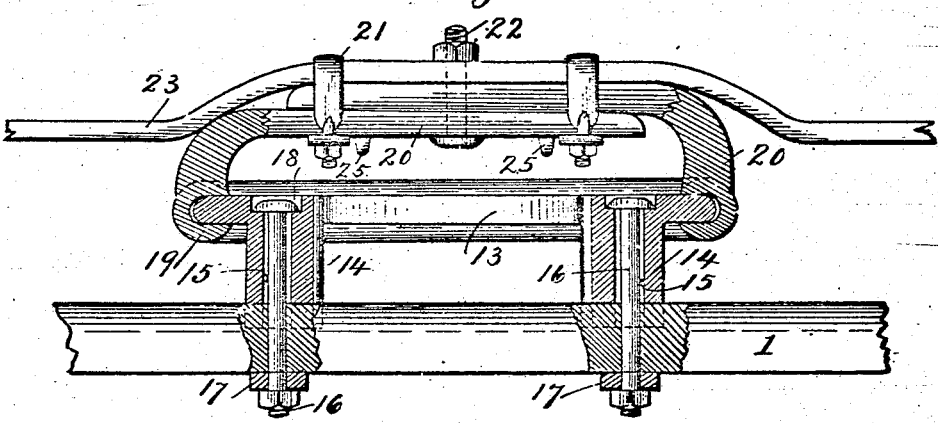
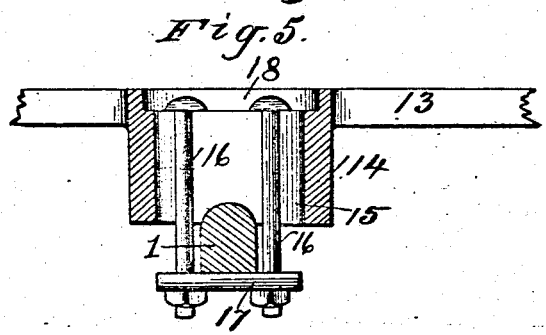
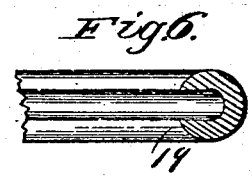
Witnesses
Inventor
M. W. Heyenga
By
Attorneys

UNITED STATES PATENT OFFICE.

MARTIN W. HEYENGA, OF CHICAGO, ILLINOIS, ASSIGNOR OF ONE-FOURTH TO MARTIN BARKMEIER AND ONE-FOURTH TO HEI BARKMEIER, OF CHICAGO, ILLINOIS.

VEHICLE RUNNING-GEAR.

No. 899,218.     Specification of Letters Patent.     Patented Sept. 22, 1908.

Application filed December 3, 1907. Serial No. 404,894.

*To all whom it may concern:*

Be it known that I, MARTIN W. HEYENGA, citizen of the United States, residing at Riverdale, Chicago, in the county of Cook and State of Illinois, have invented certain new and useful Improvements in Vehicle Running-Gears, of which the following is a specification.

This invention comprehends certain new and useful improvements in vehicle running gear, and the primary object of the invention is an improved construction of fifth-wheel, so arranged that it may be readily and securely attached to axles of different sizes and to vehicles embodying springs of either the end or the side variety, the running gear embodying the invention in the present instance being of that type in which the parts are so arranged that the rear axle will turn upon the turning of the front axle, thus enabling the vehicle to be turned about in a restricted space.

With these and other objects in view as will more fully appear as the description proceeds, the invention consists in certain constructions and arrangements of the parts that I shall hereinafter fully describe and then point out the novel features in the appended claims.

Figure 1:
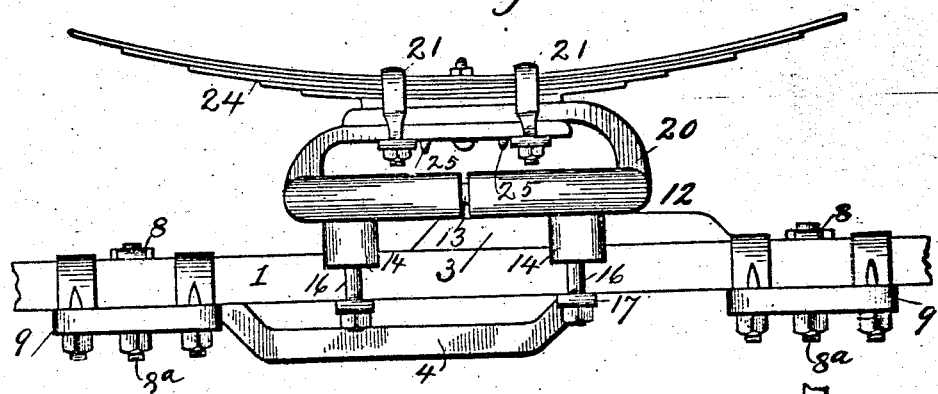
Figure 2:
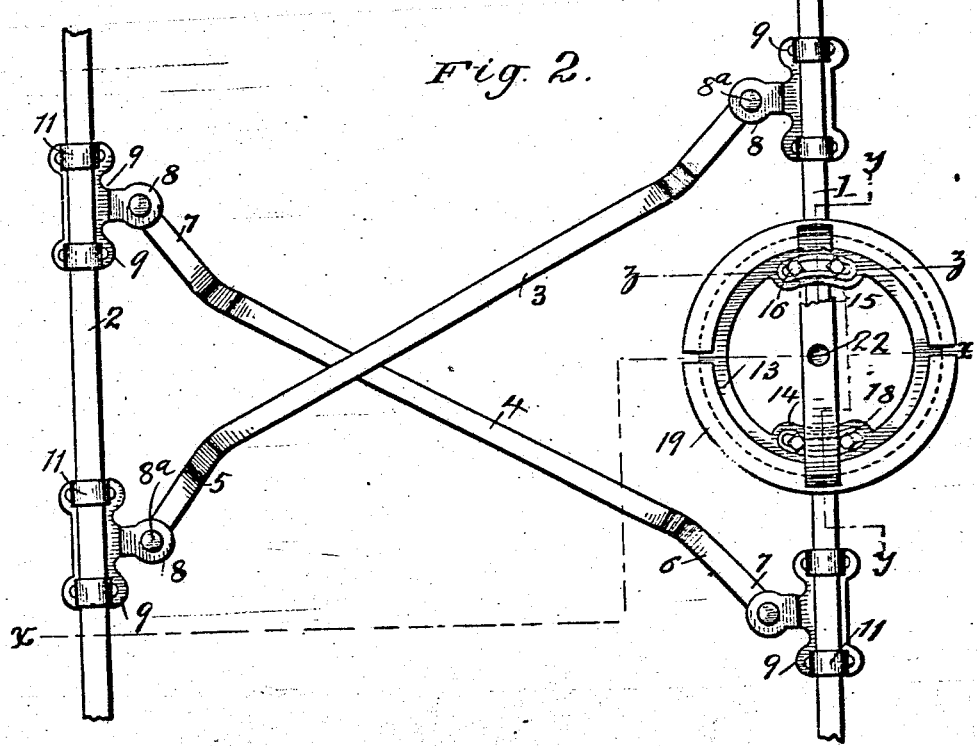

For a full understanding of the invention, reference is to be had to the following description and accompanying drawings, in which:

Figure 1 is a front elevation of my improved vehicle running gear; Fig. 2 is a top plan view thereof; Fig. 3 is a longitudinal sectional view on the line x—x of Fig. 2; Fig. 4 is a sectional view on the line y—y of Fig. 2; Fig. 5 is a similar view on the line z—z of Fig. 2; and, Fig. 6 is a sectional perspective view of a portion of one member of the fifth wheel hereinafter specifically referred to.

Corresponding and like parts are referred to in the following description and indicated in all the views of the drawings by the same reference characters.

Referring to the drawings, the numeral 1 designates the front axle of a vehicle, 2 the rear axle thereof, and 3 and 4 the two obliquely extending reaches arranged to effect the turning of the rear axle upon the turning of the front axle to effect a short turn. The reach 3 extends over the reach 4 and is provided with an upwardly bowed, but longitudinally straight intermediate portion 5, and the end reach 4 is correspondingly provided with a downwardly bowed intermediate portion 6. Both reaches are formed with outwardly deflected ends, as indicated at 7, so that the main portions of the reaches will be positioned near the middle of the vehicle body, so as to be inconspicuous and so located as to in no wise interfere with the steps of the vehicle body. It is to be understood that both of these reaches are preferably rigid throughout their length, so as to prevent any severing or twisting movement of the rear axle when the vehicle is being drawn along a straight stretch of road. The ends 7 of the respective reaches 3 and 4 are received in the forked brackets 8 of reach coupling irons 9 extending underneath the respective axles. Each coupling iron 9 is formed at its ends with slots 10, and clips 11 embrace the axles with their ends extending through said slots and secured therein by nuts, as shown. The bolts 8ª which pivotally connect the ends of the reaches with the coupling irons 9 obviously may be countersunk in said brackets, or otherwise.

My improved construction of fifth wheel 12 embodies an annular plate 13 constituting the relatively movable member of the fifth wheel, said plate being formed at substantially diametrically opposite points with downwardly extending standards 14, relatively wide, as clearly illustrated in the drawing. Each of these standards 14 is formed with a segmental vertically opening slot 15 and clip bolts 16 are secured in the respective slots and extend downwardly therefrom on opposite sides of the front axles, glands 17 being secured to the respective pairs of clip bolts by nuts, as clearly illustrated in the drawings. By the provision of the segmental slots 15, it is obvious that the clip bolts 16 may be adjusted towards or away from each other, so as to render the fifth wheel susceptible of attachment to axles of different widths. Preferably each standard 14 is formed at its upper end with a recess 18 in registry with its slot 15, so as to provide a countersink for the heads of the bolts.

The relatively stationary element of the fifth wheel comprises two semicircular channeled rims 19 arranged with their ends in substantial abutment and embracing the outer edge of the annular plate 13, whereby to form a channeled guide-way for said plate. The rims 19 are formed at correspondingly opposite points, respectively, with arms 20, and the said arms project inwardly in diametrical relation to the completed circle formed by the two rims and overlapping each other as shown. Clips 21 embrace the two overlapping arms 20, and in addition to said clips, a bolt 22 may pass through said arms, between the clips, to secure the two arms together. 23 designates a spring supporting cross bar, illustrated in Fig. 4, the ends of said cross bar projecting laterally beyond the fifth wheel and arranged to support the ends of bowed supporting springs of the side bow variety. This bar is not intended for use with end springs, but is dispensed with in such event and the said end spring, a portion of which is illustrated in Fig. 1, designated 24, is embraced by the clips 21, as well as secured to the arms 20 by means of the bolt 22. Preferably the lowermost arm of the two is formed with depending nibs 25 against which the glands of the clips 21 are intended to abut, so as to prevent the said clips from moving out of their places.

In the practical application of my improved short turning vehicle running gear, it is evident from the foregoing description in connection with the accompanying drawings, that the reaches may be very readily clipped to the front and rear axles, and that the fifth wheel elements may be as easily secured to the front axle and vehicle body or springs thereof, the standards of the annular plate 13 on the fifth wheel and their segmental slots adapting the fifth wheel construction to axles of different widths. The semicircular channeled rim 19 may be easily applied to the outer edge of the annular plate 13 and secured in operative relation thereto by means of the two overlapping arms 20 with their clips 21 and bolt 22 and an end spring of the vehicle body may be easily secured to the said arms 20 by the bolt 22 passing therethrough and the clips 21, while, if it is desired to apply the invention to a vehicle employing springs of the side-bow type, the supporting cross bar 23 may be easily secured in place, as above described. Obviously upon the turning of the front axle in either direction, the rear axle will turn commensurately in the opposite direction, so as to enable the vehicle to be turned about in a circumscribed area.

Preferably the inner edges of the forked brackets 8 are slightly rounded off, as indicated in Fig. 3, for the purpose of giving the reaches some free play vertically, so that when a front wheel runs over a rock or other obstruction, or enters a rut or depression, the reaches will have no jarring effect on the brackets.

Having thus described the invention, what is claimed as new is:

1. In a vehicle, a fifth wheel comprising a relatively movable element formed with downwardly extending standards, means for securing said standards to a vehicle axle, a relatively stationary element consisting of semicircular channeled rims embracing the outer edge of the relatively movable element, said rims being formed with inwardly extending overlapped arms, and means for securing said arms together and to the body of a vehicle.

2. In a vehicle, a fifth wheel comprising a relatively movable element, a relatively stationary element having a guiding connection with the movable element, and provided at opposite points with inwardly extending overlapping arms, the lowermost arm being formed on its lower side with nibs, and clips designed to secure said arms together and provided with glands adapted to abut against said nibs.

3. In a vehicle, a fifth wheel comprising a relatively stationary element, and a relatively movable element having a guiding connection therewith, the stationary element being formed at opposite points with inwardly extending overlapping arms, clips designed to secure said arms together, and a cross bar extending beyond said arms and secured thereto, said cross bar being designed for the support of side-bow springs.

In testimony whereof I affix my signature in presence of two witnesses.

MARTIN W. HEYENGA. [L. S.]

Witnesses:
OSCAR R. HILLSTROM,
EDWARD BOUMA.